United States Patent Office 2,959,566
Patented Nov. 8, 1960

2,959,566

STABILIZATION OF CHLORO-POLYMERS AGAINST THERMAL DEGRADATION

Billy E. Burgert and Robert L. Hudson, Midland, Mich., assignors to The Dow Chemical Company, Midland, Mich., a corporation of Delaware No Drawing. Filed July 26, 1956, Ser. No. 600,171

6 Claims. (Cl. 260—45.8)

This invention relates to the thermal stabilization of high molecular weight organic materials containing inorganic acid forming elements. More particularly it relates to compositions of such materials wherein the formation of free inorganic acids due to thermal decomposition is inhibited.

It is known that high molecular weight organic materials, such as the haloethylene polymers, containing inorganic acid forming elements undergo considerable degradation and discoloration with formation of those inorganic acids when they are exposed to elevated temperatures, like those encountered in normal thermal fabrication procedures. That thermal sensitivity has seriously limited the commercial utility of such materials. On of the common means of alleviating that degradation has been to employ certain additives as heat stabilizers in formulations based on those materials. The prior known additives have consisted commonly of inorganic salts which were incompatible with the polymer and were high melting preventing the production of transparent articles, or were organo-metallic compounds which were expensive and difficult to prepare, and in some instances were detrimental to the stability of other ingredients of the formulation. The desirable characteristics, other than compatibility and inertness, of a suitable heat stabilizer are manifold and varied. It would be odor-, taste-, and color-free, be non-toxic, and be insoluble in water and the common household solvents. Because of the many requirements and desirable characteristics for a useful heat stabilizer, it is impossible for an investigator to predict the effectiveness of any particular compound with any degree of certainty and continuous search is being made for new and more effective heat stabilizers.

It is accordingly an object of this invention to provide a novel thermally stabilized composition based on high molecular weight organic materials containing inorganic acid forming elements.

It is a further object to provide such compositions which are thermally stabilized with metal-free stabilizers.

The above and related objects are accomplished by means of a composition comprising a high molecular weight organic material containing inorganic acid forming elements and normally subject to degradation and discoloration with the formation of inorganic acid on thermal exposure together with stabilizing amounts of an epoxy compound having the general formula:

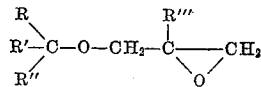

wherein R and R' are independently selected from the group consisting of hydrogen, alkyl, aryl, and substituted aryl, and R'' is selected from the group consisting of aryl and substituted aryl, and R''' is selected from the group consisting of hydrogen, halogen, alkyl, aryl, and substituted aryl. Compositions thus prepared show outstanding stability to the degradative effects of thermal exposure.

Among the high molecular weight organic materials for use in these compositions are the haloethylene polymers. As typical examples of those polymers may be mentioned the polymers of vinyl chloride and of vinylidene chloride, and the copolymers of vinyl chloride and vinylidene chloride with each other or with another monoethylenically unsaturated monomer, such as acrylonitrile and vinyl acetate. Other haloethylene polymers are chlorinated hydrocarbon polymers, such as chlorinated polyethylene and chlorinated rubber. Still other examples of thermally unstable organic materials are the halogenation products of fats, oils, waxes, and high boiling hydrocarbons, such as naphthalene, diphenyl, and the solid paraffins. The polymers and copolymers consisting predominantly of vinylidene chloride are particularly sensitive to thermal exposure and are accordingly most in need of stabilization according to the invention.

The stabilizers useful in the compositions of this invention are those epoxy compounds falling within the scope of the above defined general formula. It has been found that at least one of the substituents R, R', and R'' attached to the alpha carbon of the non-epoxy side must be aryl or susbtituted aryl such as tolyl, methoxyphenyl, chlorophenyl, and the like. When all of those groups are other than aryl the compound has no permanent utility as a stabilizer in these compositions.

Typical members of compounds falling within the scope of the formula are:

1-benzyloxy-2,3-epoxypropane
1,2-epoxy-3-(alpha-methylbenzyloxy)propane
1-(benzhydryloxy)-2,3-epoxypropane In a typical preparation of the epoxy compounds 61 parts by weight of benzhydryl alcohol and 8 parts by weight of sodium were heated for 10 hours in 300 parts of xylene. The reaction mass was then cooled and 61 parts by weight of epichlorohydrin added. The mass was heated for 6 hours at 100° C. and filtered and the xylene distilled off. The residue was distilled and the fraction boiling at 180–205° C. at 15 millimeters of mercury collected. That fraction was taken up in benzene and filtered over aluminum oxide and washed with benzene. The benzene was evaporated and the product recrystallized from petroleum ether. The 1-(benzhydryloxy)-2,3-epoxypropane was a creamy-white solid melting at 49–50° C. Alternate procedures for preparing the compounds employing an allylic chloride in forming the ether in place of epichlorohydrin may be used. The ether must then be epoxidized. The procedure and reactants to be employed in preparing other compounds of the class will be apparent.

The epoxy compounds of this invention are white solids or colorless liquids so that white and transparent articles may be produced from compositions stabilized with them.

The epoxy compounds of this invention show stabilizing effectiveness when used in an amount of at least one percent by weight based on the weight of the normally unstable organic compound. It is preferred to use from 1 to 8 percent by weight. When more than eight percent is used, the stabilizers become economically unattractive, no additional benefits result, and some of the physical properties of the composition may suffer. These compounds show greater stabilizing effectiveness toward the indicated organic materials than prior known completely organic stabilizers. Because of their completely organic character they are capable of greater compatibility with the stabilized materials than the inorganic and organo-metallic stabilizers.

The epoxy compounds of this invention may be employed without adverse effect with other additives, such as pigments, fillers, light stabilizers, and plasticizers, which are commonly used in such compositions.

By way of example several sample compositions were prepared from 92.5 parts by weight of a copolymer prepared from 85 percent by weight of vinylidene chloride and 15 percent vinyl chloride, 2.5 parts by weight of tertiary butyl phenyl salicylate as a light stabilizer, and 5 parts of ethyl phthalyl ethyl glycollate as a plasticizer. One composition was left unstabilized as a blank, to one was added 3 percent by weight a 1-(o-biphenylyloxy)-2,3-epoxy propane, a known heat stabilizer, and to the others was added 3 percent by weight of compounds of this invention. The compositions were all evaluated according to a standard test in which a sample of at least 20 grams is subjected to a temperature of 178° C. and the pressure of the evolved hydrohalide gas is used to determine the degree of thermal degradation. The results are relative to a standard and are reported as "T" values which are the times required for the samples to reach an arbitrary rate of pressure rise. Thus, a more thermally stable composition will show a higher "T" value than a less stable composition.

The compositions were also subjected to a second testing procedure wherein 10 grams of composition was placed in a test tube which was heated at 178° C. in an oil bath for a standard length of time. The height of the composition in the test tube before and after heating was measured and the difference compared with standard samples. The results are reported as volume foam index which is a value relative to the standard and in which increasingly higher values indicate decreasing thermal stability. The results of this test are shown in the following table along with the "T" values determined above.

| Stabilizer | "T" value | Volume foam index |
|---|---|---|
| For comparison: | | |
| None | 5 | 16 |
| 1-(o-biphenylyloxy)-2,3-epoxypropane | 13 | 8 |
| Compounds of this invention: | | |
| 1-benzyloxy-2,3-epoxypropane | 16 | 2 |
| 1,2-epoxy-3-(alpha-methylbenzyloxy)propane | 16 | 3 |
| 1-(benzhydryloxy)-2,3-epoxy propane | 20 | 1 |

From the results it can be seen that the compositions of this invention have greater thermal stability than compositions containing a known organic heat stabilizer.

Similar results are obtained when the epoxy compounds of this invention are employed as stabilizers in compositions based on the polymer and copolymers of vinyl chloride.

We claim:

1. A thermally stable composition comprising a chloroethylene polymer selected from the class consisting of the homopolymer of vinyl chloride, the homopolymer of vinylidene chloride, copolymers of vinyl chloride and vinylidene chloride, copolymers of vinyl chloride with a monoethylenically unsaturated comonomer, and copolymers of vinylidene chloride with a monoethylenically unsaturated comonomer and from 1 to 8 percent of an ether having the general formula:

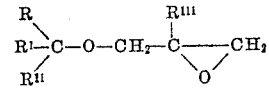

wherein R and R' are independently selected from the group consisting of hydrogen and phenyl, R'' is phenyl and R''' is selected from the group consisting of hydrogen, and phenyl.

2. The composition claimed in claim 1, wherein said chloroethylene polymer is a copolymer composed predominantly of vinylidene chloride with a complementary amount of a monoethylenically unsaturated comonomer.

3. The composition claimed in claim 1, wherein said chloroethylene polymer is a copolymer of vinylidene chloride and vinyl chloride.

4. The composition claimed in claim 1, wherein said epoxy compound is 1-benzyloxy-2,3-epoxypropane.

5. The composition claimed in claim 1, wherein said epoxy compound is 1,2-epoxy-3-(alpha-methylbenzyloxy) propane.

6. The composition claimed in claim 1, wherein said epoxy compound is 1-(benzhydryloxy)-2,3-epoxypropane.

References Cited in the file of this patent

UNITED STATES PATENTS

| 2,166,604 | Meyer | Jul. 18, 1939 |
| 2,501,026 | Cahnmann et al. | Mar. 21, 1950 |
| 2,761,788 | Lowe | Sept. 4, 1956 |
| 2,769,798 | Meis et al. | Nov. 6, 1956 |

FOREIGN PATENTS

| 418,230 | Great Britain | Oct. 22, 1934 |
| 584,972 | Great Britain | Jan. 28, 1947 |

OTHER REFERENCES

Greenspan et al., Industrial and Eng. Chem., vol. 45, No. 12, December 1953, pages 2722–2726.

Webster's New International Dictionary, Second Edition, 1956, G. and C. Merriam Company, Springfield, Mass., page 2662.